United States Patent [19]

Cheng

[11] Patent Number: 5,554,679
[45] Date of Patent: Sep. 10, 1996

[54] PTC CONDUCTIVE POLYMER COMPOSITIONS CONTAINING HIGH MOLECULAR WEIGHT POLYMER MATERIALS

[76] Inventor: Tai C. Cheng, 3375 Kenzo Ct., Mountain View, Calif. 94040

[21] Appl. No.: 447,749

[22] Filed: May 23, 1995

Related U.S. Application Data

[63] Continuation-in-part of Ser. No. 242,614, May 13, 1994, abandoned.

[51] Int. Cl.[6] ........................................... C08K 3/00
[52] U.S. Cl. ........................... 524/495; 524/496; 524/440
[58] Field of Search ................................. 524/495, 496, 524/440

[56] References Cited

U.S. PATENT DOCUMENTS

| | | | |
|---|---|---|---|
| 3,823,217 | 7/1974 | Kampe et al. | 264/105 |
| 4,514,620 | 4/1985 | Cheng et al. | 219/553 |
| 4,818,439 | 4/1989 | Blackledge et al. | 252/511 |
| 4,944,974 | 7/1990 | Zachariades | 428/36.1 |
| 5,106,540 | 4/1992 | Barma et al. | 252/511 |
| 5,111,025 | 5/1992 | Barma et al. | 219/217 |
| 5,143,649 | 9/1992 | Blackledge et al. | 252/511 |
| 5,171,774 | 12/1992 | Ueno et al. | 524/495 |
| 5,174,924 | 12/1992 | Yamada et al. | 252/511 |

OTHER PUBLICATIONS

Harvey L. Stein, "Ultrahigh Molecular Weight Polyethylenes (UHMWPE)", reprinted from *Engineered Materials Handbook*, vol. 2, (1992, ASM International), pp. 167–171.
Himont Bulletin HPE–101A, 1989.

*Primary Examiner*—Edward J. Cain
*Attorney, Agent, or Firm*—Schneck & McHugh

[57] ABSTRACT

A conductive polymer composition exhibiting PTC behavior and the method of making the composition are disclosed. The composition includes a particulate conductive filler and a polymeric portion. The polymeric portion contains a volume-expansion-regulating high molecular weight polymer, such as ultra high molecular weight polyethylene (UHMWPE), that resists melting and causes an increase in the volume of the composition, upon heating, but migrates minimally within the composition. The high molecular weight polymer preferably has a linear thermal expansion coefficient of at least $200 \times 10^{-6}/°$ C. The polymeric portion also contains a melt-extrudable polyolefin matrix in which the conductive filler and the high molecular weight polymer are dispersed. The high molecular weight polymer is present in an amount which allows the final composition to be melt-extrudable. An electrical device containing a PTC element that utilizes the novel composition and at least two electrodes is also disclosed. The resulting materials are applicable to switch devices, self-limiting heaters, EMI, ESD, utility, and telecommunications components.

32 Claims, 1 Drawing Sheet

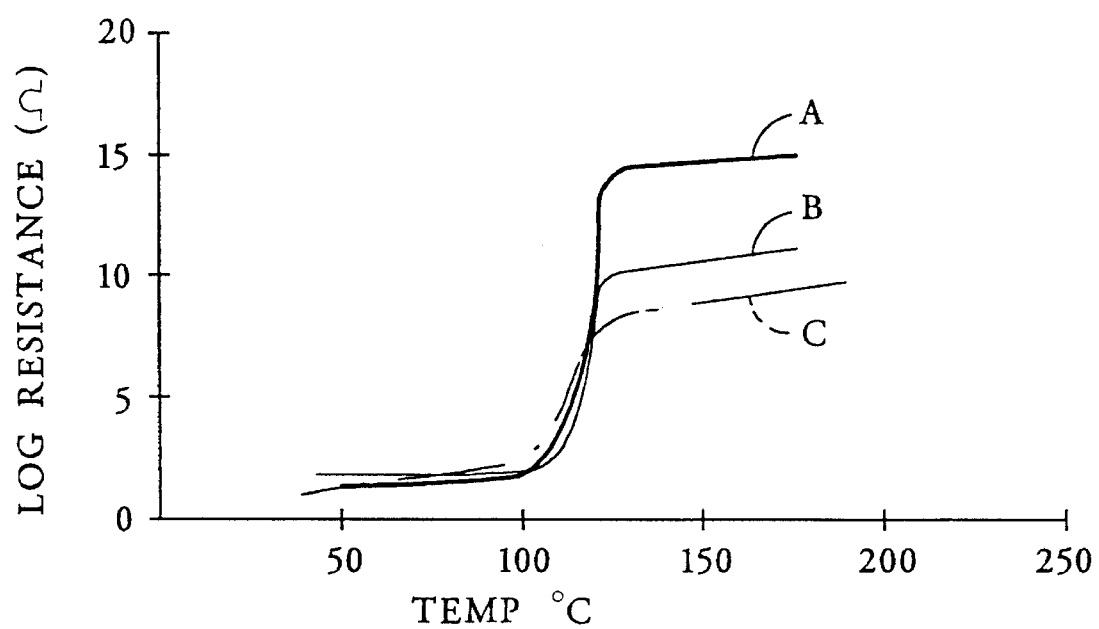

5,554,679

PTC CONDUCTIVE POLYMER COMPOSITIONS CONTAINING HIGH MOLECULAR WEIGHT POLYMER MATERIALS

CROSS-REFERENCE TO RELATED APPLICATION

This is a continuation-in-part of patent application Ser. No. 08/242,614, filed May 13, 1994, now abandoned.

TECHNICAL FIELD

This invention relates to compositions of conductive material that exhibit positive temperature coefficient (PTC) behavior and to devices made with such compositions.

BACKGROUND ART

PTC or autotherming behavior is a characteristic of the resistivity of a composition at certain temperatures. A composition that exhibits PTC behavior has an $R_{14}$ value of at least 2.5, where $R_{14}$ is the ratio of the resistivities at the end and the beginning of a 14° C. range, an $R_{100}$ value of at least 10, where $R_{100}$ is the ratio of the resistivities at the end and the beginning of a 100° range, and the composition also preferably has an $R_{30}$ value of at least 6, where $R_{30}$ is the ratio of the resistivities at the end and the beginning of a 30° C. range. A plot of the log of the resistance of an element composed of a PTC composition versus temperature will often show a sharp change in slope over a part of the temperature range in which the composition has an $R_{100}$ value of at least 10.

Conductive polymer compositions exhibiting PTC behavior are especially useful when incorporated into electrical devices for applications that require self-controlling temperature. For example, the electrical devices may be heaters, circuit protection devices, or sensors and the applications may include utility equipment, telephone equipment, wires, cables, or computers.

The PTC composition art includes many blends of materials, but mostly all include a particulate conductive filler, such as carbon black, dispersed in a crystalline or semi-crystalline resin or matrix. The resin material is usually a polymer comprised of polyolefins, polyamides, polyimides, polycarbonates, fluoropolymers, or carbohydrates. The particulate conductive materials may consist of organics, inorganics, or organometallics.

In U.S. Pat. No. 5,174,924 to Yamada et al., a conductive polymer composition exhibiting PTC behavior is disclosed. This composition contains a crystalline polymer and a carbon black having an average particle diameter of at least about 60 millimicrons and a Dibutyl Phthalate (DBP) absorption of at least about 80 cc/100 g. Use of the particular carbon black in this composition contributes to the composition's high breakdown voltage.

U.S. Pat. No. 5,171,774 to Ueno et al. discloses a method for producing a PTC composition wherein the carbon black component is etched at a high temperature to increase its specific surface area. The resulting porous carbon black is then blended with a crystalline polymer to form a conductive polymer composition.

U.S. Pat. No. 4,818,439 and its related U.S. Pat. No. 5,143,649, both granted to Blackledge et al., reveal an electrically conductive polymer composition with PTC behavior comprising a finely divided electrically conductive carbon black dispersed within a low molecular weight polymer material and a method of manufacturing this composition. Inclusion of the low molecular weight polymer allows for the virtual elimination of the annealing step in the composition formation process.

In U.S. Pat. No. 5,106,540 to Barma et al., a series of conductive polymer compositions is disclosed. The filler in these compositions is itself a composite. The compositions may exhibit PTC, ZTC (zero temperature coefficient), or NTC (negative temperature coefficient) behavior, depending on the conductive filler which is used. Various components and various methods of making the compositions are disclosed.

It is an object of the present invention to teach a conductive polymer composition that is simple to make and form into useful devices and which exhibits a high degree of autotherming behavior.

SUMMARY OF THE INVENTION

The above object has been achieved with a PTC conductive polymer composition that includes a high molecular weight polymer in combination with a lower molecular weight polyolefin matrix, together comprising the polymeric portion of the composition, and a conductive filler. The polyolefin matrix is melt-extrudable and preferably exhibits melting at a maximum of 350° C. The high molecular weight polymer resists melting and is present in an amount such that interference with the extrudability of the polyolefin matrix does not occur. The composition is easily made by one-step melt-mixing of the key ingredients and extrusion to form a desired shape.

Upon heating of the final composition, the high molecular weight polymer increases the composition's volume with minimal migration of the high molecular weight polymer within the polymeric portion of the composition. This results in strong autotherming behavior.

The relative amounts of the ingredients and the method for making the composition result in an ordered crystalline or semi-crystalline structure for the final composition. This structure is believed to be critical to the high degree of autotherming exhibited by the final composition of the present invention, which is on the order of several magnitudes higher than the prior art compositions. Particularly, it is believed that the high molecular weight polymer serves as a volume-expansion regulator for the polyolefin matrix. The volume-expansion-regulating high molecular weight polymer of the present invention preferably has a linear thermal expansion coefficient of at least $200 \times 10^{-6}/°$ C. The linear thermal expansion coefficient of a material is defined as the ratio of the change in length per degree C to the length at 0° C. The polyolefin matrix preferably exhibits PTC behavior, as well. The combination of the two materials according to the present invention allows for a synergistic effect on the PTC behavior of the final composition.

Another aspect of the present invention discloses an electrical device which comprises (1) an element having a PTC conductive polymer composition according to the present invention, and (2) at least two electrodes which can be connected to a source of electrical power to cause current to flow through the PTC element.

BRIEF DESCRIPTION OF THE DRAWING

FIG. 1 shows a graph of the log of resistance of various PTC polymer compositions of the present invention at different temperatures.

BEST MODE FOR CARRYING OUT THE INVENTION

The present invention includes a conductive polymer composition exhibiting PTC characteristics and having a polymeric portion that contains a melt-extrudable polyolefin matrix and dispersed therein a high molecular weight organic polymer with a high linear thermal expansion coefficient. The high molecular weight polymer serves as a volume-expansion-regulator and, upon heating of the final composition, increases the composition's volume with minimal migration of the high molecular weight polymer within the polymeric portion of the composition. The high molecular weight polymer itself resists melting at normal operating temperatures. Additionally, the high molecular weight polymer is present in an amount such that it does not interfere with the melt-processing or extrusion capabilities of the polyolefin matrix. "High molecular weight polymer" as used here signifies a polymer of a molecular weight significantly higher than the polyolefin matrix such that the high molecular weight polymer resists melting and the polyolefin matrix is easily melt-processable.

The high molecular weight polymer preferably has a linear thermal expansion coefficient of at least $200 \times 10^{-6}/°C$. Examples of such high molecular weight materials are ultra-high-molecular-weight polyethylene (UHMWPE), polyamides such as nylon, polyesters such as polyethylene terephthalate (PET), fluoropolymers such as ethylene tetrafluoroethylene (ETFE) and polytetrafluoroethylene (PTFE), and ionomers.

The preferred volume-expansion-regulating high molecular weight polymer of the present invention is UHMWPE. UHMWPE is a polymer of a molecular weight generally in the range of 2,000,000 to 6,000,000 daltons. This molecular weight is approximately four to ten times greater than that of high density polyethylene (HDPE) resin, which is a preferred polyolefin matrix of the present invention, and on the order of two to ten times higher in molecular weight than the components generally used in the polymeric portion of similar PTC compositions. UHMWPE is currently commercially available from Hoechst Celanese, Himont and Westlake. Its properties of high abrasion resistance, high impact strength, noise abatement, non-stick, and light weight have directed UHMWPE to applications involving seals and pistons, the bulk handling of materials such as grains and gravel, and the textile industry. In addition, UHMWPE's compatibility with human tissue has led to its use in prosthesis and surgical supports.

In the PTC conductive polymer composition, UHMWPE preferably has a molecular weight in the range of 2,000,000 to 6,000,000 daltons. Its proportion within the polymeric portion of the PTC composition varies from 5 to 50% by weight, but preferably is in the range of 5 to 30%. The remainder of the polymeric portion of the PTC composition comprises the polyolefin matrix which is melt-extrudable and which preferably melts at a maximum of 350° C. Examples of such materials are high or low density polyethylene, linear low density polyethylene, and ethylene vinyl acetate (EVA). The polymeric portion, as a whole, makes up 10 to 80% by weight of the PTC composition. The preferred range for the polymeric portion is 25 to 60%. The polymeric portion of the PTC composition has a range of crystallinity of 5 to 99%, but preferably has a range of 10 to 70% crystallinity. The melting point of the polymeric portion of the PTC composition is in the range of 40° to 300+° C., but preferably is in the range of 50° to 200° C.

A preferred embodiment of the present invention utilizes UHMWPE as the volume-expansion-regulating high molecular weight polymer and HDPE as the polyolefin matrix. These two components, although chemically related, differ in their molecular weight, crystallinity, density, melting point, extrudability, and most likely in the amount in which they are present in the polymeric portion of the present invention. HDPE typically has a molecular weight of 500,000 as opposed to UHMWPE's molecular weight of 2,000,000 or more. It is well known that molecular weight is an important variable in the resulting physical properties of thermoplastic resins. The crystallinity of HDPE is typically higher than UHMWPE. This higher crystallinity of the polyolefin matrix contributes to the PTC behavior, and to the sharp melting point, and thus the processability, of the composition. The percentage of UHMWPE to be used within the composition represents a compromise between desired auto-therming behavior, because a greater amount of UHMWPE contributes to a stronger PTC effect, and processability, because UHMWPE is difficult to process.

In addition to the polymeric portion, the PTC composition of the present invention contains a particulate conductive filler, such as carbon black. For electromagnetic interference applications, silver powder may be the preferred particulate conductive filter. The filler is dispersed within the polymeric portion of the PTC composition and more particularly, within the polyolefin matrix. Its inclusion allows for electrical conductivity of the resulting composition. The proportion of particulate conductive filler within the PTC composition is in the range of 15 to 90% by weight. Preferably, the filler is in the range of 25 to 40%, so as to allow for high flexibility and tensile strength of the PTC composition. It is well known to vary the relative amounts of the polymeric portion and the conductive portion of a PTC composition, depending on the desired conductivity and other characteristics of the final composition.

The polyolefin matrix, a polymer which is easily processed by melt-extrusion, serves as a base in which the other components of the composition are dispersed and is vital to the melt-processing during preparation of the PTC composition. The polyolefin matrix also serves as an adhesion material, because typically adhesion between a volume-expansion-regulating high molecular weight polymer, such as UHMWPE, and a particulate conductive filler, such as carbon black, is low. In addition, components such as fire retardants and antioxidants may be included for stability of the PTC composition. The antioxidant is preferably present in an amount 0.5 to 4% by volume of the polymeric component.

The method of making the present invention is simple, but important to its function. First, the three components comprising the main portion of the composition are mixed together, as in a Brabender or Banbury mixer. Antioxidant and fire retardant may also be added to the mixture. The mixture is heated while continuing to mix, so that the polyolefin matrix melts and the other components are evenly dispersed within the polyolefin matrix. For example, at this point in the preparation of a typical composition, HDPE will melt, but UHMWPE and carbon black will not melt and instead be dispersed within the HDPE. Then, the heated mixture is extruded, as with a Brabender extruder, to form a desired shape, such as a tube, rod, or sheet. If desired, the formed material may be crosslinked with a chemical crosslinker or radiation, after extrusion has occurred.

The polyolefin matrix preferably exhibits a significant PTC behavior, without additional polymers, due to its crystalline or semi-crystalline structure. The polyolefin matrix preferably melts at a maximum of 350° C., so that standard melt-extrusion equipment may be used to prepare the composition and the components of the composition are ordered properly in the final composition.

The composition of the present invention is thus also capable of being melt-processed and extruded. The volume-expansion-regulating high molecular weight polymer should be present in an amount which is insufficient to cause interference with the processability of the overall composition and more particularly with the processability of the polyolefin matrix. For example, UHMWPE is described as unable to be melt-processed or extruded due to its extremely high molecular weight. In the composition of the present invention, when UHMWPE is used as the volume-expansion-regulating high molecular weight polymer, it is present within a small enough amount and dispersed within the polyolefin matrix so as to allow the overall composition to be extrudable.

Examples of compositions of the present invention are given in the following table:

| Ingredient | Weight % | | |
| --- | --- | --- | --- |
| | Composition A (20%) | Composition B (10%) | Composition C (Control) |
| UHMWPE | 7.40 | 3.70 | φ |
| Marlex 6003 (high density PE) | 29.68 | 33.38 | 37.08 |
| Statex G (carbon black) | 33.70 | 33.70 | 33.70 |
| Hydral 705 (fire retardant) | 28.00 | 28.00 | 28.00 |
| Irganox 1010 (antioxidant) | 1.22 | 1.22 | 1.22 |

The composition presented as Composition A consists of a polymeric portion, i.e., UHMWPE and Marlex 6003 together, containing 20% UHMWPE by weight. [7.40 / (7.40+ 29.68)×100] Composition B represents a composition that is 10% UHMWPE per polymeric portion by weight. Composition C does not include any UHMWPE and is included in the example as a control group.

FIG. 1 shows a plot of resistance against temperature for the PTC compositions given in the example. The curve representing Composition B, which contains UHMWPE, illustrates the greater resistivity beyond the switching temperature of a composition containing UHMWPE over a composition without any UHMWPE, i.e. Composition C. For example, Composition C shows 3–6 decades ($10^3$–$10^6$) of resistivity change, while Composition B shows 3–10 decades. Composition A, which contains an even higher proportion of UHMWPE than does Composition B, shows a correspondingly greater resistivity beyond the switching temperature. In FIG. 1, e.g., Composition A shows 3–15 decades of resistivity change. The switching temperature represents the maximum temperature at which the resistance of the PTC composition is constant, but above which the resistance begins to rise. If the PTC composition is incorporated into an electrical device such as a circuit protection device, then the switching temperature will represent the temperature at which the device is tripped and the resistance rises dramatically so that electrical current flow through the circuit is impeded.

A device of the present invention includes an element made of the PTC conductive polymer composition of the present invention. The PTC element or a portion thereof includes the PTC conductive polymer composition, as described above. The device of the present invention also includes at least two electrodes which can be connected to a source of electrical power to cause current to flow through the PTC element. Such devices are useful as switch devices, self-limiting heaters, electromagnetic interference (EMI) devices, electrostatic discharge (ESD) devices, and utility and telecommunications components.

Although the examples given utilize UHMWPE, other high molecular weight organic polymers that resist melting but, upon heating of the final composition, increase the volume of the PTC composition with minimal migration of the high molecular weight polymer, may be substituted. These high molecular weight polymers are generally made of between 20,000 and 100,000 monomer units. For example, polyamides such as nylon, polyesters such as PET, and fluoropolymers such as ETFE, or ionomers may be used. PTFE is a particularly useful volume-expansion-regulating high molecular weight polymer for the PTC composition of the present invention and, like UHMWPE, is also not melt-extrudable. The optimum weight percentage within the polymeric portion of the composition for these high molecular weight polymers is determined based on the level of desired autotherming behavior and the processability of the materials, as before, but generally will remain in the range of 5 to 50%. For example, 3.70 weight % PTFE may be combined with 33.38 weight % HDPE in the Composition B example, described above. As is well known, additives may be needed for effectively combining a high molecular weight polymer and a polyolefin matrix which are not chemically related.

These high molecular weight polymers, as used in the present invention, contribute to a stronger PTC behavior and also provide greater electrical stability of the devices due to less migration or evaporation of the polymer. The polymer chain entanglements produced by these high molecular weight polymers upon heating provide increased void volumes and density changes over previously used polymers. If a low molecular weight polymer were to be used as a means of controlling volume expansion, it would eventually become part of the polyolefin matrix due to melting. Evaporation of the material would also be a concern. The result would be little effect on the PTC behavior of the composition. It is believed that PTC behavior is linked to the volume change of the polymer component of a composition.

In theory, the polyolefin matrix carries within it evenly dispersed volume-expanding high molecular weight polymer and particulate conductive filler, in the completed composition of the present invention. When the composition is utilized for its autotherming abilities, e.g. in a device such as a switch, this relative ordering of the components, provided by the melt-extrusion processability of the overall composition, contributes greatly to the PTC behavior. Thus, at a low temperature, the molecules of the composition are ordered in a compact fashion. This places the conductive filler particles in relatively close proximity which allows a tunneling effect of the electrons and results in a composition, and related device, which exhibits high conductivity.

When the composition is heated past its switching temperature, however, the polyolefin matrix and the volume-expansion-regulating high molecular weight polymer expand, as by increased void volume between molecules, resulting in larger distances between the conductive filler particles and interruption of internal conductive paths. As the conductive filler particles move further apart, an electric current encounters increasing difficulty in passing through the composition, or related device, thus leading to decreased conductivity and increased resistivity of the composition and device.

Because the composition of the present invention has superior autotherming behavior as signified by the very wide range between its conductive and resistive states, it is a highly useful composition. It provides for a sensitive fail safe switch in an electrical circuit. This superior autotherming behavior allows for a high degree of resistivity when a circuit is subjected to a short or overvoltage and a correspondingly long and steady return to its conductive state after the device has been tripped, thus helping to eliminate fire and other damage to machinery which incorporates a device of this composition in its circuitry.

The method of making the PTC composition of the present invention also represents a significant advancement over the prior art. Previously, the benefits of high volume expansion exhibited by high molecular weight materials such as UHMWPE were not utilized to full advantage because of the difficulties involved in processing a composition containing such a material.

I claim:

1. A PTC conductive polymer composition comprising:
   a melt-extrudable polyolefin matrix,
   a melt-resistant, volume-expansion-regulating polymer characterized by a linear thermal expansion coefficient of at least $200 \times 10^{-6}/^\circ$ C., the volume-expansion-regulating polymer exhibiting volume expansion with minimal migration upon heating of the composition, the volume-expansion-regulating polymer being dispersed within the polyolefin matrix but being present in an amount of at most 50% by weight of the total polymeric portion such that interference with the extrudability of the polyolefin matrix does not occur, and
   a particulate conductive filler, containing only PTC conductive particles, dispersed within the polyolefin matrix along with but distinct from the volume-expansion-regulating polymer.

2. The composition of claim 1 wherein the polyolefin matrix melts at a maximum of 350° C.

3. The composition of claim 1 wherein the volume-expansion-regulating polymer comprises 5 to 30% by weight of the polymeric portion.

4. The composition of claim 1 wherein the number-average molecular weight range of the volume-expansion-regulating polymer is 2,000,000 to 6,000,000 daltons.

5. The composition of claim 1 wherein the volume-expansion-regulating polymer comprises ultra high molecular weight polyethylene.

6. The composition of claim 1 wherein the volume-expansion-regulating polymer is a number-average 20,000-to-100,000-monomer-unit polymer selected from the group consisting of polyamide, polyester, fluoropolymer, and ionomer.

7. The composition of claim 1 wherein the volume-expansion-regulating polymer comprises polytetrafluoroethylene.

8. The composition of claim 1 wherein the polyolefin matrix comprises a high density polyethylene.

9. The composition of claim 1 wherein the polyolefin matrix is selected from the group consisting of low density polyethylene, linear low density polyethylene, and ethylene vinyl acetate.

10. The composition of claim 1 wherein the polymeric portion comprises 25 to 60% by weight of the composition.

11. The composition of claim 1 wherein the polymeric portion has a range of crystallinity of 5 to 99%., with the crystallinity of the polyolefin matrix being higher than the crystallinity of the volume-expansion-regulating polymer.

12. The composition of claim 11 wherein the polymeric portion has a range of crystallinity of 10 to 70%.

13. The composition of claim 1 wherein the particulate conductive filler comprises carbon black.

14. The composition of claim 1 wherein the particulate conductive filler comprises 25 to 40% by weight of the composition.

15. The composition of claim 1 further comprising an antioxidant.

16. The composition of claim 1 further comprising a fire retardant.

17. An extrudable conductive polymer composition which exhibits PTC behavior, the composition comprising:
   (a) a polymeric portion having
      (i) a volume-expansion-regulating polymer composed of an ultra high molecular weight polyethylene (UHMWPE) which resists melting up to at least 350° C. and has a linear thermal expansion coefficient of at least $200 \times 10^{-6}/^\circ$ C., and which migrates minimally within the polymeric portion upon heating of the composition, and
      (ii) an extrudable polyolefin matrix that exhibits melting at a maximum of 350° C., and
   (b) a particulate filler with PTC conductive properties which is dispersed within the polymeric portion.

18. The composition of claim 17 wherein the UHMWPE comprises 5 to 50% by weight of the polymeric portion.

19. The composition of claim 18 wherein the UHMWPE comprises 5 to 30% by weight of the polymeric portion.

20. The composition of claim 17 wherein the number-average molecular weight range of the UHMWPE is 2,000,000 to 6,000,000 daltons.

21. The composition of claim 17 wherein the polyolefin matrix comprises high density polyethylene.

22. The composition of claim 17 wherein the polymeric portion has a range of crystallinity of 10 to 70%.

23. The composition of claim 17 wherein the particulate filler comprises carbon black.

24. The composition of claim 17 further comprising an antioxidant.

25. The composition of claim 17 further comprising a fire retardant.

26. A method of preparing a conductive polymer composition which exhibits PTC behavior, the method comprising:
   (a) mixing together and dispersing at least the following components:
      (i) a polyolefin matrix that exhibits melting at a maximum of 350° C.,
      (ii) a volume-expansion-regulating high molecular weight polymer which resists melting up to at least 350° C. and has a linear thermal expansion coefficient of at least $200 \times 10^{-6}/^\circ$ C., and which migrates minimally upon heating of the composition, and
      (iii) a particulate filler with PTC conductive properties,
   (b) heating while continuing to mix the components, so as to cause melting of the polyolefin matrix, the volume-expansion-regulating polymer and PTC particulate filter remaining substantially solid during this heating step and keeping their distinct identities from each other within the melted polyolefin matrix, and
   (c) extruding the heated components to form a desired shape for the composition.

27. The method of claim 26 further comprising cross-linking the composition after extrusion.

28. An electrical device comprising:
   (1) a PTC element formed from an extrudable PTC conductive polymer composition, the composition comprising:

(a) a polymeric portion having
   (i) a volume-expansion-regulating high molecular weight polymer which resists melting up to at least 350° C. and has a linear thermal expansion coefficient of at least $200 \times 10^{-6}/°$ C., and which migrates minimally within the polymeric portion upon heating of the composition, and
   (ii) an extrudable polyolefin matrix that exhibits melting at a maximum of 350° C., the volume-expansion-regulating polymer being present in an amount of at most 50% by weight of the total polymeric portion such that interference with the extrudability of the polyolefin matrix does not occur, and
(b) a particulate filler with PTC conductive properties which is dispersed within the polymeric portion, the particulate filter maintaining its distinct identity from the volume-expansion-regulating polymer upon heating of the composition, and
   (2) at least two electrodes which can be connected to a source of electrical power to cause current to flow through the PTC element.

29. The device of claim 28 wherein the volume-expansion-regulating polymer comprises 5 to 30% by weight of the polymeric portion.

30. The device of claim 28 wherein the volume-expansion-regulating polymer of the PTC element comprises an ultra high molecular weight polyethylene.

31. The device of claim 28 wherein the polyolefin matrix comprises a high density polyethylene.

32. The device of claim 28 wherein the particulate filler comprises carbon black.

\* \* \* \* \*